Aug. 4, 1925.
S. C. BROWN
CLOTHESLINE REEL
Filed May 19, 1922
1,548,302
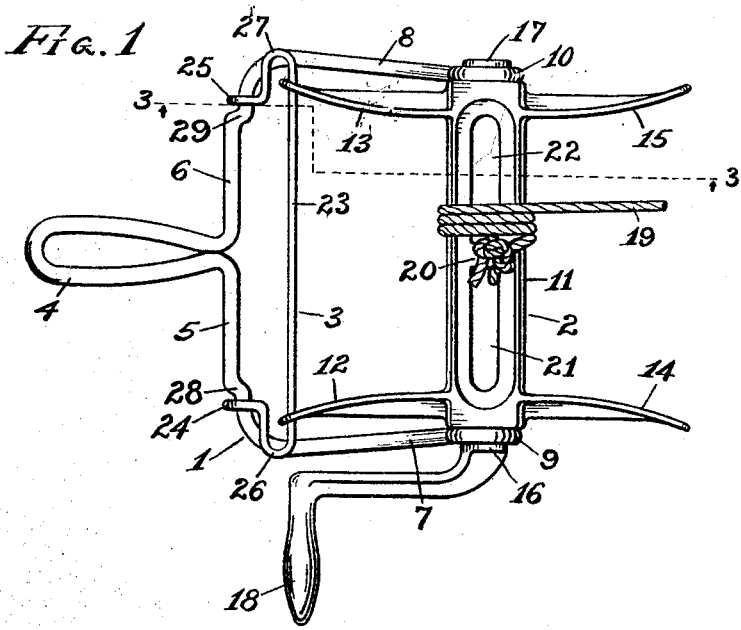
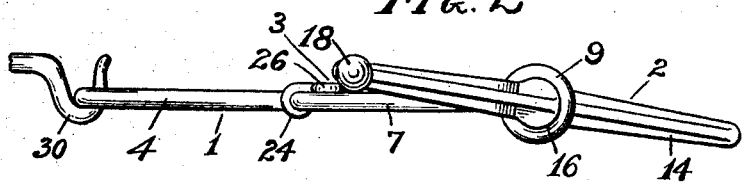
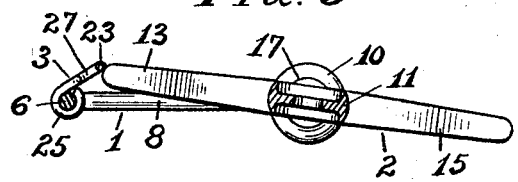
Inventor
S. C. Brown Patented Aug. 4, 1925.

1,548,302

UNITED STATES PATENT OFFICE.

SCHUYLER C. BROWN, OF CLEVELAND, OHIO, ASSIGNOR OF ONE-FIFTH TO FRANK DUREITZ, OF CLEVELAND, OHIO.

CLOTHESLINE REEL.

Application filed May 19, 1922. Serial No. 562,170.

*To all whom it may concern:*

Be it known that I, SCHUYLER C. BROWN, a citizen of the United States, residing at Cleveland, in the county of Cuyahoga and State of Ohio, have invented certain new and useful Improvements in Clothesline Reels, of which the following is a specification.

This invention relates to clothes-line reels, and has for its principal object to provide a clothes-line reel of simple and practical construction. which is not only convenient for holding a clothes line and winding or unwinding the same therefrom, but also is useful for the stretching of the clothes line.

With the above and other objects in view, the invention will be hereinafter fully described as illustrated in the accompanying drawings, and the novel features thereof will be distinctly pointed out in the appended claims.

In the drawings similar characters of reference are used to designate corresponding parts.

Figure 1 is a plan view of a clothes-line reel constructed in accordance with my invention.

Fig. 2 is a side elevation of the same, and

Fig. 3 is a longitudinal sectional view taken on line 3—3 of Fig. 1, the spool being shown in the position of clearing the bar of the locking device.

Referring to the drawings, it will be seen that the clothes-line reel illustrated consists of three main parts—a yoke 1 for rotatably supporting a spool 2, and a locking device 3 for preventing backward rotation of the spool. The yoke 1 is formed from a single piece of suitable wire and consists of a looped handle 4, from which extends opposite arms 5 and 6, the free ends of which are bent at right angles thereto to form sides 7 and 8 terminating in transversely aligning eyes 9 and 10. The spool 2 consists of a hub 11 with which are integrally formed pairs of opposite sides 12—13 and 14—15, and bosses 16 and 17 at its ends for rotatably supporting the spool in the eye 9 and 10 of the yoke, and a suitable crank-handle 18 forming a part of the boss 9. A clothes line such as indicated by 19 may have one of its ends attached to central bar 20 formed in the hub 11 of the spool by providing openings 21 and 22 therein, and is adapted to be wound between the pairs of sides 12—13 and 14—15 by the rotating of the spool by means of the crank-handle 18.

In order to permit the winding of the clothes line upon the spool and automatically lock the spool against backward rotation, the before mentioned locking device 3 is employed and consists of a bar 23 pivotally connected by means of downwardly bent eyes 24 and 25 to the arms 5 and 6 of the yoke and the ends 26 and 27 of said bar extend beyond the sides 7 and 8 thereof and are adapted to rest upon said sides. As the spool 2 is rotated for winding up the clothes line, the ends of its sides 12—13 and 14—15 will engage and lift the bar 23 until it clears the same, but when the spool begins to rotate backwardly the ends of said sides will engage said bar which is resting upon the sides of the yoke, and thus lock the spool against further backward rotation. For preventing longitudinal movement of the locking device, the arms 5 and 6 of the yoke are bent to form shoulders at 28 and 29.

In practice, the clothes line may be pulled to unwind it from the spool, and if its free end is attached to a support and the looped handle 4 hung on a hook as indicated at 30, the clothes line may be stretched by turning the crank-handle 18, and upon releasing the crank-handle, the spool will revolve backwardly until the sides thereof rest upon the bar 23, thereby locking the spool and holding the clothes line in a stretched position.

Having fully described my invention, what I claim is:

1. In a clothes-line reel, the combination of a yoke, a hub rotatably supported by the yoke, the hub having sides extending therefrom, and means pivoted to the yoke adapted to rest upon the yoke and be engaged by the sides of the hub for locking the hub against backward rotation, substantially as described.

2. In a clothes-line reel, the combination of a yoke, a hub rotatably supported by the yoke, the hub having sides extending therefrom, a bar pivoted to the yoke, the bar being adapted to rest upon the yoke and to be engaged by the sides of the hub to prevent backward rotation thereof, substantially as described.

3. In a clothes-line reel, the combination of a yoke, a hub rotatably supported by the yoke, the hub having sides extending therefrom, a bar pivoted to the yoke, the bar being adapted to engage the yoke, and the sides of the hub being adapted to engage the bar when in engagement with the yoke to prevent backward rotation of the hub, substantially as described.

4. In a clothes-line reel, the combination of a yoke, the yoke having arms and sides, a hub rotatably supported in the sides of the yoke, sides extending from the hub, a bar pivoted to said arms and adapted to rest upon the sides of the yoke, and the sides of the hub being adapted to engage the bar when in engagement with the sides of the yoke to prevent backward rotation of the hub, substantially as described.

5. In a clothes-line reel, the combination of a yoke, the yoke having arms and sides, a hub rotatably supported in the sides of the yoke, a handle for rotating the hub, sides extending from the hub, a bar, the bar being adapted to rest upon the sides of the yoke and be engaged by the sides of the hub, the ends of the bar being bent inwardly, the inwardly bent ends of the bar being pivotally connected to the arms of the yoke, and the arms of the yoke having shoulders for preventing longitudinal movement of the bar, substantially as described.

In testimony whereof I affix my signature.

SCHUYLER C. BROWN.